United States Patent [19]

Olson

[11] 4,305,540
[45] Dec. 15, 1981

[54] ADHESIVE DISPERSING ANVIL AND METHOD OF USING

[75] Inventor: Elvin G. Olson, Olympia, Wash.

[73] Assignee: The Boeing Company, Seattle, Wash.

[21] Appl. No.: 173,226

[22] Filed: Jul. 28, 1980

Related U.S. Application Data

[62] Division of Ser. No. 73,174, Sep. 6, 1979, Pat. No. 4,242,158.

[51] Int. Cl.³ ............................................. B21J 15/00
[52] U.S. Cl. ................................... 227/61; 29/469.5; 227/14; 15/316 R
[58] Field of Search ................. 29/469.5, 512; 227/4, 227/6, 14, 61; 408/56, 57, 59, 60; 15/316 R

[56] References Cited

U.S. PATENT DOCUMENTS

| | | | |
|---|---|---|---|
| 1,016,994 | 2/1912 | Higgins | 15/316 R |
| 2,216,403 | 10/1940 | Oeckl et al. | 227/61 X |
| 2,985,468 | 5/1961 | Shaw et al. | 408/57 X |
| 3,386,639 | 6/1968 | Unger | 227/14 |
| 3,750,229 | 8/1973 | Rossomme | 15/316 R X |
| 3,908,510 | 9/1975 | Koskolos et al. | 408/56 X |
| 4,164,879 | 8/1979 | Martin | 408/56 X |
| 4,174,801 | 11/1979 | Holland et al. | 227/4 |
| 4,202,073 | 5/1980 | Hughes | 15/316 R X |

Primary Examiner—Paul A. Bell
Attorney, Agent, or Firm—Morris A. Case; Bernard A. Donahue

[57] ABSTRACT

An anvil having a working end away from a mounting shank, has compressed air flowing through the anvil to feed outward to the working end. An insert fastened to a panel is secured to the panel by forming on one end of the insert and by bonding with an adhesive on the other end. The working end of the anvil presses against the insert during forming and the flowing compressed air blows excess adhesive from the contacted surface of the insert.

2 Claims, 4 Drawing Figures

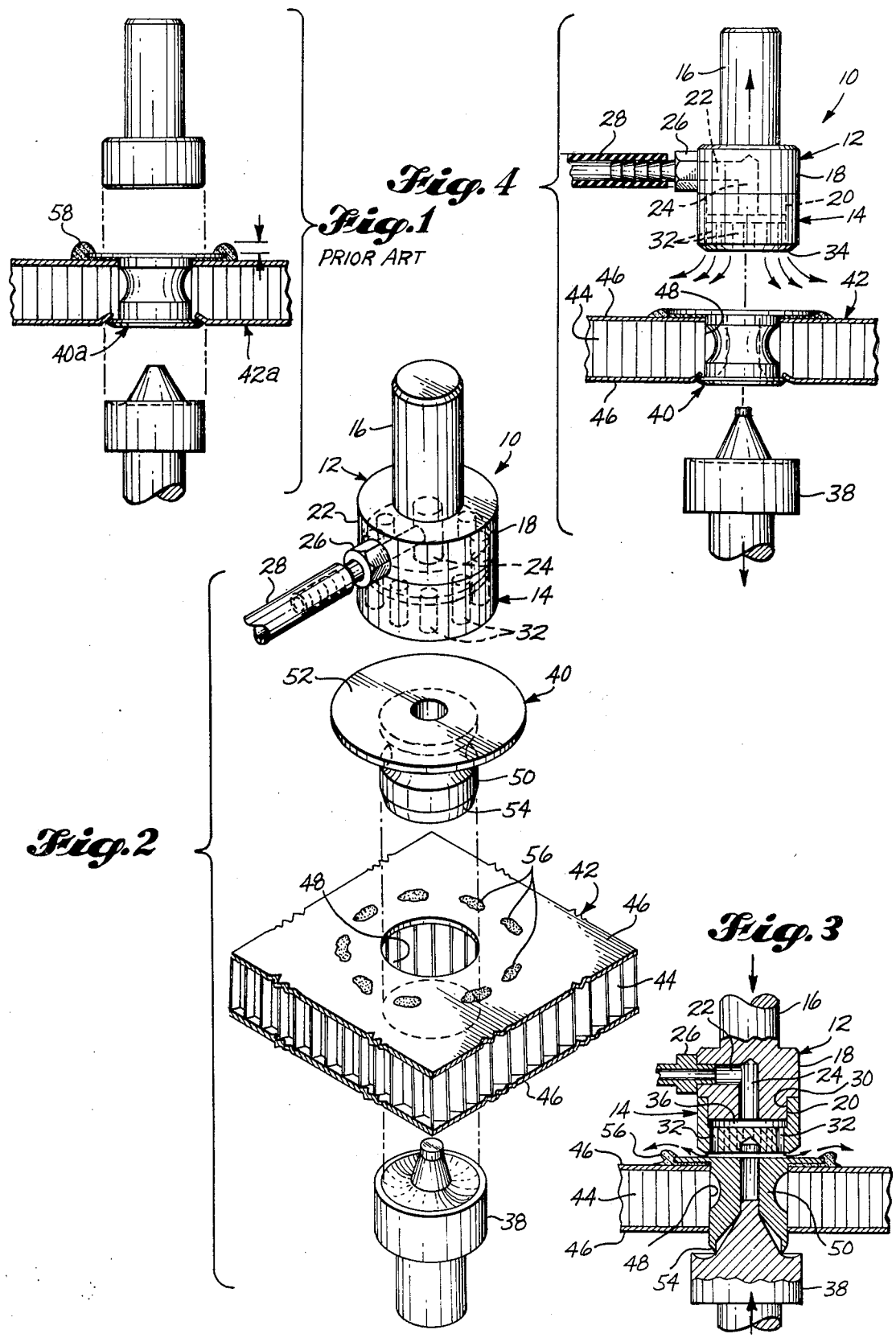

ADHESIVE DISPERSING ANVIL AND METHOD OF USING

This is a division of application Ser. No. 073,174 filed Sept. 6, 1979 now U.S. Pat. 4,242,150.

BACKGROUND OF THE INVENTION

Many of the floor panels on an airplane are made of a composite lightweight honeycomb core material with skin on either face. Wherever it is necessary to fasten to the panel an insert is placed in the panel and a fastener joined through the insert. The insert has a large flat head on one end that is adhesively joined to the panel. The adhesive tends to flow onto the outside of the head of the insert, and when cured presents a raised area that costs considerable time and money to remove. It has been found that the insert may be formed in position without the undesirable resin or adhesive buildup.

There are numerous patents where a blast of fluid is used to control thickness of a viscous fluid during a forming operation. In Pat. No. 2,894,856 to Schwendemann et al, a continuous galvanizing process immersing metal in liquid zinc, a heavier layer builds up along each edge; so a blast of air directed along each edge contacts and blows the excess material away to give a uniform thickness. In U.S. Pat. No. 3,968,279 to Brown et al, a glass bottle is dipped in plastisol and the bottle is then raised vertically through an inwardly and downwardly directed ring of compressed air to control the amount of plastisol remaining on the bottle.

SUMMARY OF THE INVENTION

An anvil has an air inlet, an air chamber, and a series of holes leading from the chamber to the working end of the anvil to provide contacting pressure and compressed air to the anvil working surface.

It is an object of this invention to provide compressed air to the working end of an anvil.

It is another object of this invention to provide a method of removing adhesive from the surface of an insert while fastening to a panel.

DESCRIPTION OF THE DRAWINGS

FIG. 1 shows a side elevational view of prior art.

FIG. 2 is an exploded perspective view of this invention.

FIG. 3 is a side elevational view partially in section showing an insert being mounted to a panel as practiced by the invention.

FIG. 4 shows a side elevational view of the insert mounted to the panel.

DETAILED DESCRIPTION

An end forming anvil 10 is made up of two members 12 and 14. The first member 12 has a shank 16 to permit mounting to a working tool, an enlarged diameter section 18, and a reduced diameter section 20. Within the enlarged diameter section there is a radially extending opening 22; which communicates with an axial opening 24 that extends to the end of the reduced diameter section. A fastener 26 is threaded into the radial opening and connects to a hose 28; which in turn is joined to a source of compressed air, not shown. The second member 14, has an axially extending opening 30, that extends part way through from one side, and a series of openings 32, that extend in an axial direction to communicate between the working end 34 of the anvil and the opening 30. The inside diameter of the opening 30 is sized to present an interference fit with the reduced diameter 20, of the first member, and when pressed together the two parts permanently join and leave a chamber 36.

The anvil 10 is used in conjunction with a forming tool 38, to set an insert 40, in a panel 42. The panel has a honeycomb core 44, face sheets 46, and a hole 48 through the panel for locating the insert. The insert has a tube like portion 60, with a thin flat base 52 on one end, and in the reformed condition, a thin walled tubular section 54 that is acted on by the forming tool.

In operation the anvil 10, and the forming tool 38, are mounted in a rivet gun, not shown. An adhesive 56, is placed on surface 46 of the panel 42, near the hole 48. The insert 40 is placed in that hole with the flat base 52 of the insert contacting the adhesive. Next compressed air is introduced through tubing 28, the rivet gun is actuated, anvil working end 34 presses the insert firmly against the adhesive and the skin surface of the panel, and end 54 is formed by tool 38 to secure the insert to the panel. As the anvil presses against the flat part of the insert, air flowing through the anvil blows the adhesive off the surface being contacted; so that adhesive is between the base and the panel skin and adjacent those surfaces, but no adhesive is on or extends above the anvil contacted surface of the flat base 52.

FIG. 1 of an insert 40a, joined to a panel 42a, shows adhesive buildup 58 when joined by the method of the prior art.

I claim:

1. An improved anvil having a shank for fastening to a riveting tool and an enlarged portion having a flat work contacting end, with the improvement comprising: a chamber within the enlarged portion of said anvil, a member within said chamber, said member having, a series of openings extending between the chamber and a work end of the anvil, and means for introducing compressed air into the chamber to pass through the openings in said member and blow an adhesive off of the surface of a fastener against which the anvil is pressed.

2. A cylindrical shaped anvil for end application of pressure comprising: a first member having progressively a shank for mounting in a working tool, an enlarged diameter section, and a reduced diameter section, and the member having an opening extending axially through the end of the reduced diameter section and a connecting opening extending radially out the side of the enlarged section and having means for connecting to a compressed air line; a second member having an axially extending opening extending part way through, from one side, with said opening sized to effect an interference fit over the reduced diameter section of the first member, and a series of axially extending holes extending from a working end of the anvil into the opening, so that the joined members provide a path through the anvil for providing compressed air to the working end of the anvil.

* * * * *